(12) United States Patent
Clinch et al.

(10) Patent No.: US 7,147,418 B2
(45) Date of Patent: Dec. 12, 2006

(54) CAGE NUT ASSEMBLY HAVING A FLEXIBLE CAGE

(75) Inventors: James Patrick Clinch, Sterling Heights, MI (US); Paul Douglas Purdy, Holly, MI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/674,198

(22) Filed: Sep. 29, 2003

(65) Prior Publication Data

US 2004/0109739 A1    Jun. 10, 2004

Related U.S. Application Data

(60) Provisional application No. 60/432,165, filed on Dec. 10, 2002.

(51) Int. Cl.
*F16B 39/284* (2006.01)
*F16B 37/08* (2006.01)

(52) U.S. Cl. .................. 411/112; 411/111; 411/432; 411/969

(58) Field of Classification Search ............ 411/111, 411/112, 113, 171, 174, 175, 432
See application file for complete search history.

(56) References Cited

U.S. PATENT DOCUMENTS

| | | | |
|---|---|---|---|
| 1,760,834 A | 5/1930 | Carr | |
| 2,234,557 A | 3/1941 | Hungerford | |
| 2,255,650 A | 9/1941 | Burke | |
| 2,258,342 A * | 10/1941 | Tinnerman | 411/112 |
| 2,303,148 A * | 11/1942 | Tinnerman | 411/111 |
| 2,390,752 A | 12/1945 | Tinnerman | |
| 2,409,209 A | 10/1946 | Johnson | |
| 2,495,037 A | 1/1950 | Tinnerman | |
| 2,567,864 A | 9/1951 | Becker | |
| 2,649,883 A | 8/1953 | Sharp | |
| 2,695,046 A * | 11/1954 | Tinnerman, III | 411/112 |
| 2,716,434 A * | 8/1955 | Crowther | 411/106 |
| 2,861,618 A * | 11/1958 | Tinnerman | 411/175 |
| 2,867,258 A * | 1/1959 | Flora et al. | 411/113 |
| 2,867,259 A | 1/1959 | Barron | |

(Continued)

FOREIGN PATENT DOCUMENTS

DE   1055718   4/1959

(Continued)

OTHER PUBLICATIONS

U.S Pat. Appl. No. 2003/0147715 published on Aug. 7, 2003; Inventor Curley, Jr. et al. entitled Locking Cage Fastener.

(Continued)

*Primary Examiner*—Katherine Mitchell
(74) *Attorney, Agent, or Firm*—Trexler, Bushnell, Giangiorgi, Blackstone & Marr Ltd.

(57) ABSTRACT

A cage nut assembly has a nut and a cage. The cage has a base having an aperture therethrough and a pair of flexible arm portions which are capable of supporting the nut off of the base. The cage nut assembly is welded to a workpiece. The workpiece is sent through an e-coat or ELPO bath. As the flexible arm portions of the cage support the nut off of the base, the possibility of the nut being stuck to the cage is reduced. A fastener is inserted through an aperture of the workpiece, through the aperture of the base and is threadedly engaged with the nut. As the fastener is torqued down, a force is applied to the nut such that the arm portions of the cage flex and allow the nut to come into contact and be secured against the base.

28 Claims, 7 Drawing Sheets

U.S. PATENT DOCUMENTS

| | | | |
|---|---|---|---|
| 2,875,805 A | | 3/1959 | Flora |
| 3,004,638 A | * | 10/1961 | Eaton ........................ 411/166 |
| 3,025,897 A | | 3/1962 | Gieleghem |
| 3,123,120 A | * | 3/1964 | Grimm et al. .............. 411/111 |
| 3,177,916 A | | 4/1965 | Rosan |
| 3,219,790 A | | 11/1965 | Johnson |
| 3,236,143 A | | 2/1966 | Wing |
| 3,255,798 A | | 6/1966 | Anderson et al. |
| 3,314,465 A | | 4/1967 | Bien |
| 3,451,455 A | * | 6/1969 | Parkin ........................ 411/108 |
| 3,556,570 A | | 1/1971 | Cosenza |
| 3,670,796 A | * | 6/1972 | Grimm ....................... 411/112 |
| 3,695,324 A | | 10/1972 | Gulistan |
| 3,765,078 A | | 10/1973 | Gulistan |
| 3,783,922 A | * | 1/1974 | Petrus ........................ 411/111 |
| 3,785,421 A | | 1/1974 | Launay |
| 3,797,358 A | | 3/1974 | Allender |
| 3,948,142 A | | 4/1976 | McKay et al. |
| 4,015,650 A | | 4/1977 | Anderson |
| 4,036,692 A | | 7/1977 | Walton |
| 4,146,074 A | | 3/1979 | Kowalski |
| 4,170,424 A | | 10/1979 | Boehm |
| 4,186,787 A | | 2/1980 | Hussain |
| 4,193,435 A | | 3/1980 | Charles et al. |
| 4,263,831 A | | 4/1981 | Smith |
| 4,557,650 A | | 12/1985 | Molina |
| 4,732,518 A | | 3/1988 | Toosky |
| 4,741,654 A | | 5/1988 | Lovisek |
| 4,762,451 A | | 8/1988 | Collins |
| 4,790,701 A | | 12/1988 | Baubles |
| 4,793,757 A | | 12/1988 | Peterson |
| 4,830,557 A | | 5/1989 | Harris et al. |
| 4,875,817 A | | 10/1989 | Suzumura et al. |
| 4,900,209 A | | 2/1990 | Reynolds |
| 5,028,189 A | * | 7/1991 | Harley ................... 411/112 X |
| 5,066,180 A | | 11/1991 | Lang et al. |
| 5,074,727 A | * | 12/1991 | Wentzel ................. 411/111 X |
| 5,096,349 A | | 3/1992 | Landy et al. |
| 5,096,350 A | | 3/1992 | Peterson |
| 5,137,406 A | | 8/1992 | Cosenza |
| 5,245,743 A | | 9/1993 | Landy et al. |
| 5,380,136 A | | 1/1995 | Copple et al. |
| 5,405,228 A | | 4/1995 | Reid et al. |
| 5,468,104 A | | 11/1995 | Reid et al. |
| 5,533,850 A | | 7/1996 | Ishihara et al. |
| 5,628,598 A | | 5/1997 | Hofle |
| 5,630,686 A | | 5/1997 | Billmann |
| 5,639,113 A | | 6/1997 | Goss et al. |
| 5,704,747 A | | 1/1998 | Hutter, III et al. |
| 5,746,561 A | | 5/1998 | Nygren, Jr. et al. |
| 5,797,581 A | | 8/1998 | Sherman |
| 5,893,694 A | | 4/1999 | Wilusz et al. |
| 5,919,016 A | | 7/1999 | Smith et al. |
| 6,077,010 A | | 6/2000 | Reid et al. |
| 6,139,237 A | | 10/2000 | Nagayama |
| 6,146,071 A | | 11/2000 | Norkus et al. |
| 6,183,180 B1 | | 2/2001 | Copple et al. |
| 6,254,325 B1 | | 7/2001 | Kun |
| 6,499,923 B1 | | 12/2002 | LeVey |
| 6,746,193 B1 | | 6/2004 | Drake |
| 2003/0129041 A1 | | 7/2003 | Mitts et al. |
| 2004/0005205 A1 | | 1/2004 | Yake et al. |

FOREIGN PATENT DOCUMENTS

| | | |
|---|---|---|
| DE | 3445514 A1 * | 12/1984 |
| DE | 19533138 | 7/1996 |
| FR | 2871535 | 6/2004 |
| GB | 687110 | 2/1953 |
| JP | 08114213 | 5/1996 |
| WO | WO03/042557 | 5/2003 |

OTHER PUBLICATIONS

U.S. Pat. Appl. Publication No. 2002/0136617 Published on Sep. 26, 2002; Inventor Imahigashi entitled Antenna Mounting Nut.

* cited by examiner

CAGE NUT ASSEMBLY HAVING A FLEXIBLE CAGE

CROSS-REFERENCE

This patent application claims the benefit of domestic priority of U.S. Provisional Application Ser. No. 60/432,165, filed Dec. 10, 2002, and entitled "Cage Nut Assembly Having a Flexible Cage".

BACKGROUND OF THE INVENTION

The present invention relates to a cage nut assembly.

Cage nut assemblies are well known in the art and provide a useful function in that they are able to hold a threaded nut at locations in a frame that are difficult or in some cases impossible to reach with a tool. Cage nut assemblies are used in vehicles for seat attachments, radiator attachments, chassis to drive train attachments, and for any other nut application that requires the nut to have an "X" and "Y" axis adjustability to accommodate tolerance variations and enable engagement thereof by a male threaded fastener.

Problems have arisen in conjunction with prior art cage nut assemblies. One problem occurs after the cages of the cage nut assemblies are welded to a mating surface, such as an automobile frame. After the cages are welded to the automobile frame, the frames are sent through an e-coat or ELPO bath that adds a corrosion or paint coating thereto. In cage nut assemblies where the underside of the nut is capable of sitting flat on the cage, the nut and cage may stick together when the e-coat or ELPO bath is applied thereto, thus removing the intended float/adjustability of the nut within the cage.

At least two known and separate United States patents have acknowledged this problem and have attempted to provide cage nut assemblies which solve the problem. U.S. Pat. No. 5,096,350 discusses the use of any item attached to either the cage or the nut, or to a third part positioned between the nut and the cage, that flattens out when the nut is torqued into place. This item allows for the stand-off needed during the e-coat and provides for a solid joint when the nut is torqued into place. These flattenable projections either on the cage or the nut, or the addition of a third part with the flattenable projections thereon, provide high manufacturing costs to the cage nut assembly.

U.S. Pat. No. 5,630,686 discusses the use of plastic rings staked at the top of a nut extrusion that hold the nut up off of the cage floor or mating panel, thus removing the possibility that the e-coat will allow the parts to stick together. The plastic rings are flexible enough to allow a solid joint to take place when the nut is lowered to interface with the cage floor or mating panel when the nut is torqued down. This patent requires the plastic rings in order to perform the desired function. The addition of the plastic rings to the cage nut assembly is expensive and the rings sometimes disengage from the assembly when the nut is torqued into place thus causing a buzz, squeak rattle ("BSR") issue with customers.

Thus, there is a need for a cage nut assembly which does not allow the nut to become stuck to the cage during the application of an e-coat or ELPO bath and which overcomes the disadvantages of the aforementioned United States patents which have attempted to solve this same problem.

OBJECTS AND SUMMARY

A primary object of an embodiment of the present invention is to provide a cage nut assembly which reduces the possibility of the nut sticking to the cage or workpiece when an e-coat or ELPO bath is applied thereto.

Another object of an embodiment of the present invention is to provide a cage nut assembly that has strong joints between the nuts and the cages after the nuts are torqued into place.

Yet another object of an embodiment of the present invention is to provide stand-off features on the nut which will reduce the amount of bearing surface interface between the cage and nut, before the nuts are torqued down.

Another object of an embodiment of the present invention is to provide a cage nut assembly where the nut is allowed to float within the cage after coating of the mating surface, which the cage is attached to.

Still another object of an embodiment of the present invention is to provide a cage nut assembly which requires less manufacturing costs in comparison to cage nut assemblies of the prior art.

Yet another object of an embodiment of the present invention is to provide a cage which is capable of supporting a nut off of a bottom wall of the cage or a mating surface prior to the coating, and which is flexible to allow the nut to be torqued down against the bottom wall of the cage or a mating surface after the coating.

Briefly, and in accordance with the foregoing, the present invention provides a cage nut assembly having a nut and a cage. The nut has two plates and a cylindrical member connecting the plates together. A threaded aperture extends through the nut. The cage has a base portion having an aperture therethrough and a pair of flexible arm portions which are capable of supporting the nut off of the base portion of the cage. Once the cage nut assembly is formed, the cage is welded to a workpiece. The workpiece is then sent through an e-coat or ELPO bath. As the flexible arm portions of the cage support the nut off of the base portion of the cage, the possibility of the nut being stuck to the cage is reduced. A fastener is then inserted through an aperture of the workpiece, through the aperture of the base portion and into the aperture of the nut such that the fastener is threadedly engaged with the nut. As the fastener is torqued down, a force is applied to the nut such that the arm portions of the cage flex and allow the nut to come into contact and be secured against the base portion of the cage.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
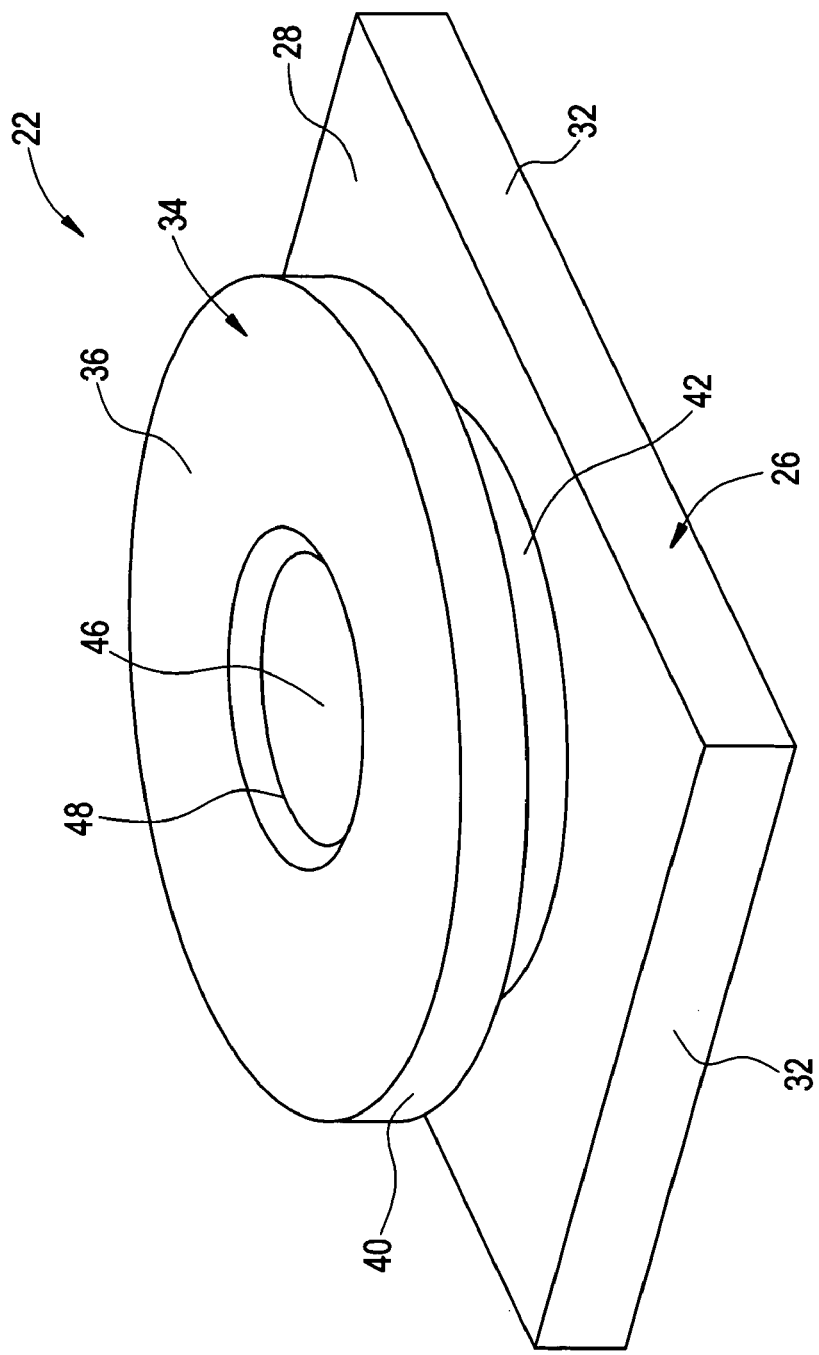
FIG. 1 is a perspective top view of a nut of the cage nut assembly in accordance with an embodiment of the present invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

The present invention relates to a cage nut assembly 20. The cage nut assembly 20 includes a nut 22 and a cage 24.

Figure 2:
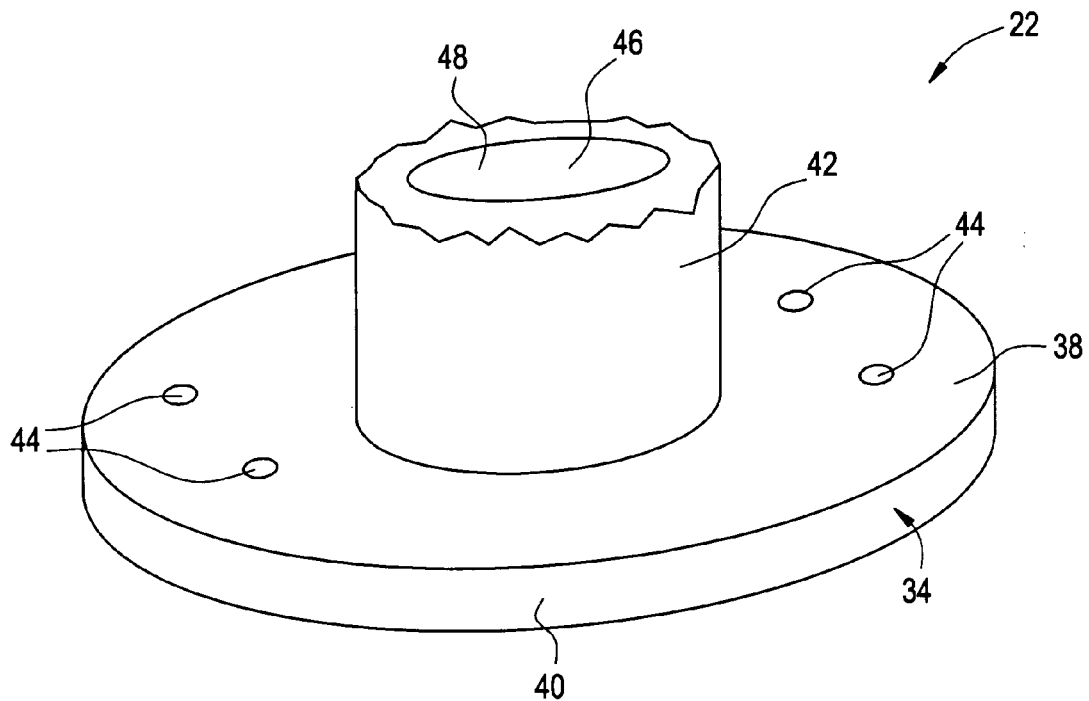
FIG. 2 is a partially-broken away bottom view of the nut of the cage nut assembly in accordance with an embodiment of the present invention.

The nut 22 is best illustrated in FIGS. 1 and 2. The nut 22 includes a plate portion 26, which is preferably rectangular, having a generally planer upper surface 28, a generally planar lower surface (not shown), and sidewalls 32 which connect the upper surface 28 to the lower surface. The nut 22 also includes a second plate portion 34, which is preferably circular, having a generally planar upper surface 36, a generally planar lower surface 38, and a sidewall 40 which connects the upper surface 36 to the lower surface 38. The plate portion 26 and the second plate portion 34 are connected to one another by a cylindrical member 42 which extends between the upper surface 28 of the plate portion 26 and the lower surface 38 of the second plate portion 34. The cylindrical member 42 is preferably in the form of a right circular cylinder. The lower surface 38 of the second plate portion 34 may have protrusions 44 extending therefrom for reasons which will be discussed in more detail herein.

An aperture 46 extends through the nut 22 from the plate portion 26, into the cylindrical member 42, and into the second plate portion 34. The aperture 46 may be closed at the lower surface 30 of the plate portion 26 or it may, preferably, extend all the way through the plate portion 26. The aperture 46 defines an aperture wall 48 which is preferably threaded and is capable of receiving a fastener 50, such as a bolt or a screw, to be attached thereto.

Figure 3:
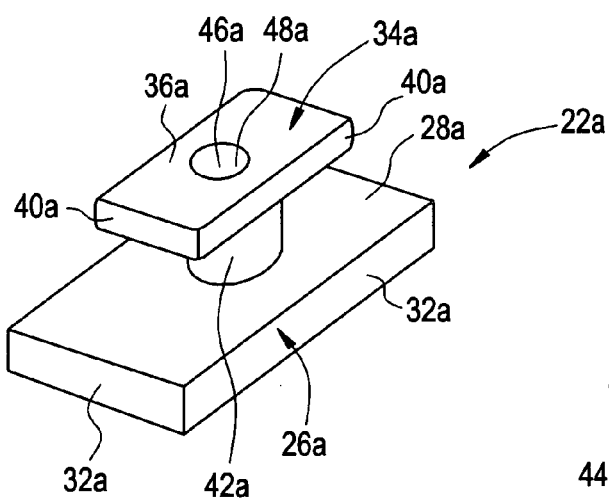
FIG. 3 is a perspective top view of an alternative nut of the cage nut assembly in accordance with an embodiment of the present invention.
Figure 4:
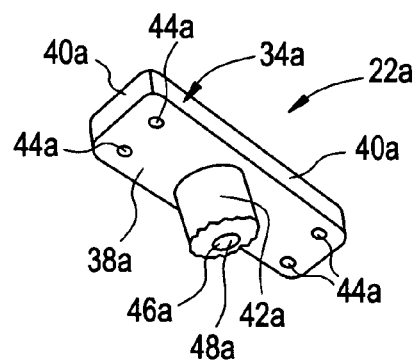
FIG. 4 is a partially-broken away bottom view of the alternative nut of the cage nut assembly in accordance with an embodiment of the present invention.

Alternatively, a nut 22a, which may be used in the cage nut assembly 20 rather than the nut 22, is best illustrated in FIGS. 3 and 4. The nut 22a includes a plate portion 26a, which is preferably rectangular, having a generally planer upper surface 28a, a generally planar lower surface (not shown), and sidewalls 32a which connect the upper surface 28a to the lower surface. The nut 22a also includes a second plate portion 34a, which is preferably rectangular, having a generally planar upper surface 36a, a generally planar lower surface 38a, and sidewalls 40a which connect the upper surface 36a to the lower surface 38a. The plate portion 26a and the second plate portion 34a are connected to one another by a cylindrical member 42a which extends between the upper surface 28a of the plate portion 26a and the lower surface 38a of the second plate portion 34a. The cylindrical member 42a is preferably in the form of a right circular cylinder. The lower surface 38a of the second plate portion 34a may have protrusions 44a extending therefrom for reasons which will be discussed in more detail herein.

An aperture 46a extends through the nut 22a from the plate portion 26a, into the cylindrical member 42a, and into the second plate portion 34a. The aperture 46a may be closed at the lower surface 30a of the plate portion 26a or it may, preferably, extend all the way through the plate portion 26a. The aperture 46a defines an aperture wall 48a which is preferably threaded and is capable of receiving a fastener 50, such as a bolt or a screw, to be attached thereto.

The nut 22, 22a may be formed by cold forming as a one-piece item. Alternatively, it can also be made by staking a cold-headed nut with the circular or rectangular plate feature formed as part of the nut, to a steel plate. The nut 22, 22a may then be heat treated, if desired, depending on the hardness of the material of the nut 22, 22a. While the nut 22a may be used in the cage nut assembly 20 rather than the nut 22, the description of the invention will be discussed with the nut 22 being used in the cage nut assembly 20 with the understanding that the nut 22a would function in a generally identical manner as will the nut 22.

Figure 5:
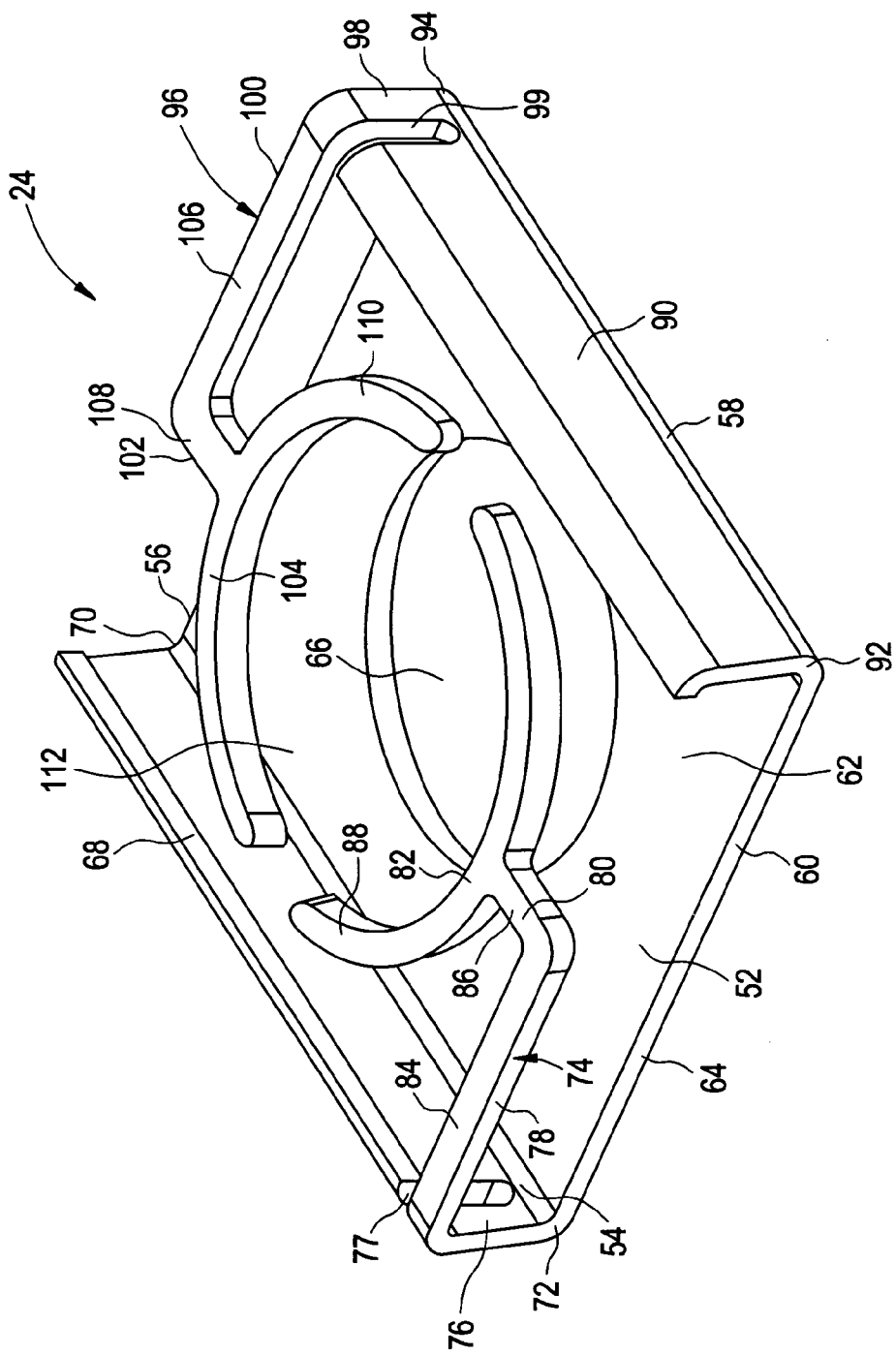
FIG. 5 is a perspective view of a cage of the cage nut assembly in accordance with an embodiment of the present invention.

The cage 24 is used for encaging and supporting the nut 22 and is best illustrated in FIG. 5. The cage 24 has a base portion 52, which is preferably rectangular, such that the base portion 52 has a first side edge 54, a second side edge 56, a third side edge 58 and a fourth side edge 60. The first and third side edges 54, 58 of the base portion 52 are parallel and opposite to one another. The second and fourth side edges 56, 60 of the base portion 52 are parallel and opposite to one another, and are perpendicular to the first and third side edges 54, 58. The base portion 52 has an upper surface 62 and a lower surface 64. An aperture 66 extends through the base portion 52 from the upper surface 62 to the lower surface 64.

A first wall portion 68 extends perpendicularly upwardly from the first side edge 54 of the base portion 52 and extends from a corner 70, which is defined by the connection of the first and second side edges 54, 56, toward a corner 72, which is defined by the connection of the first and fourth side edges 54, 60. The first wall portion 68 extends substantially along a majority of the length of the first side edge 54, from the corner 70 toward the corner 72, but does not extend to the corner 72.

A first arm portion 74 also extends from the first side edge 54 of the base portion 52 and extends from the corner 72 toward the corner 70. The first arm portion 74 has a first portion 76, a second portion 78, a third portion 80 and a fourth portion 82. The first portion 76 of the first arm portion 74 extends perpendicularly upwardly from the first side edge 54 of the base portion 52 such that a gap 77 is formed between the first portion 76 of the first arm portion 74 and the first wall portion 68. The second portion 78 of the first arm portion 74 extends perpendicularly outwardly from the first portion 76 of the first arm portion 74 toward the third side edge 58 of the base portion 52, and is generally parallel to the base portion 52, such that the second portion 78 of the first arm portion 74 has an upper surface 84 which is parallel to the upper surface 62. The third portion 80 of the first arm portion 74 extends perpendicularly outwardly from the second portion 78 of the first arm portion 74 toward the second side edge 56 of the base portion 52, and is generally parallel to the base portion 52, such that the third portion 80 of the first arm portion 74 has an upper surface 86 which is parallel to the upper surface 62. The fourth portion 82 of the first arm portion 74 is generally C-shaped and extends outwardly toward the second side edge 56 of the base portion 52, and is generally parallel to the base portion 52, such that the fourth portion 82 of the first arm portion 74 has an upper surface 88 which is parallel to the upper surface 62. The first arm portion 74 is formed of a flexible material for reasons which will be discussed further herein.

A second wall portion 90 extends perpendicularly upwardly from the third side edge 58 of the base portion 52 and extends from a corner 92, which is defined by the connection of the third and fourth side edges 58, 60, toward a corner 94, which is defined by the connection of the second and third side edges 56, 58. The second wall portion 90 extends substantially along a majority of the length of the third side edge 58, from the corner 92 toward the corner 94, but does not extend to the corner 94.

A second arm portion 96 also extends from the third side edge 58 of the base portion 52 and extends from the corner 94 toward the corner 92. The second arm portion 96 has a first portion 98, a second portion 100, a third portion 102 and a fourth portion 104. The first portion 98 of the second arm portion 96 extends perpendicularly upwardly from the third side edge 58 of the base portion 52 such that a gap 99 is formed between the first portion 98 of the second arm portion 96 and the second wall portion 90. The second portion 100 of the second arm portion 96 extends perpendicularly outwardly from the first portion 98 of the second arm portion 96 toward the first side edge 54 of the base portion 52, and is generally parallel to the base portion 52, such that the second portion 100 of the second arm portion 96 has an upper surface 106 which is parallel to the upper surface 62. The third portion 102 of the second arm portion 96 extends perpendicularly outwardly from the second portion 100 of the second arm portion 96 toward the fourth side edge 60 of the base portion 52, and is generally parallel to the base portion 52, such that the third portion 102 of the second arm portion 96 has an upper surface 108 which is parallel to the upper surface 62. The fourth portion 104 of the second arm portion 96 is generally C-shaped and extends outwardly toward the fourth side edge 60 of the base portion 52, and is generally parallel to the base portion 52, such that the fourth portion 104 of the second arm portion 96 has an upper surface 110 which is parallel to the upper surface 62. The second arm portion 96 is formed of a flexible material for reasons which will be discussed further herein.

As illustrated in FIG. 5, the C-shaped fourth portions 82, 104 of the first and second arm portions 74, 96, respectively, generally form an opening 112 (although not specifically defined as the C-shaped fourth portions 82, 104 do not come into contact with one another to close off the opening 112) therebetween which is generally in alignment with the aperture 66 of the base portion 52 of the cage 24. As will be discussed further herein, the C-shaped fourth portion 82, 104 of the first and second arm portions 74, 96, respectively, support the nut 22.

Figure 6:
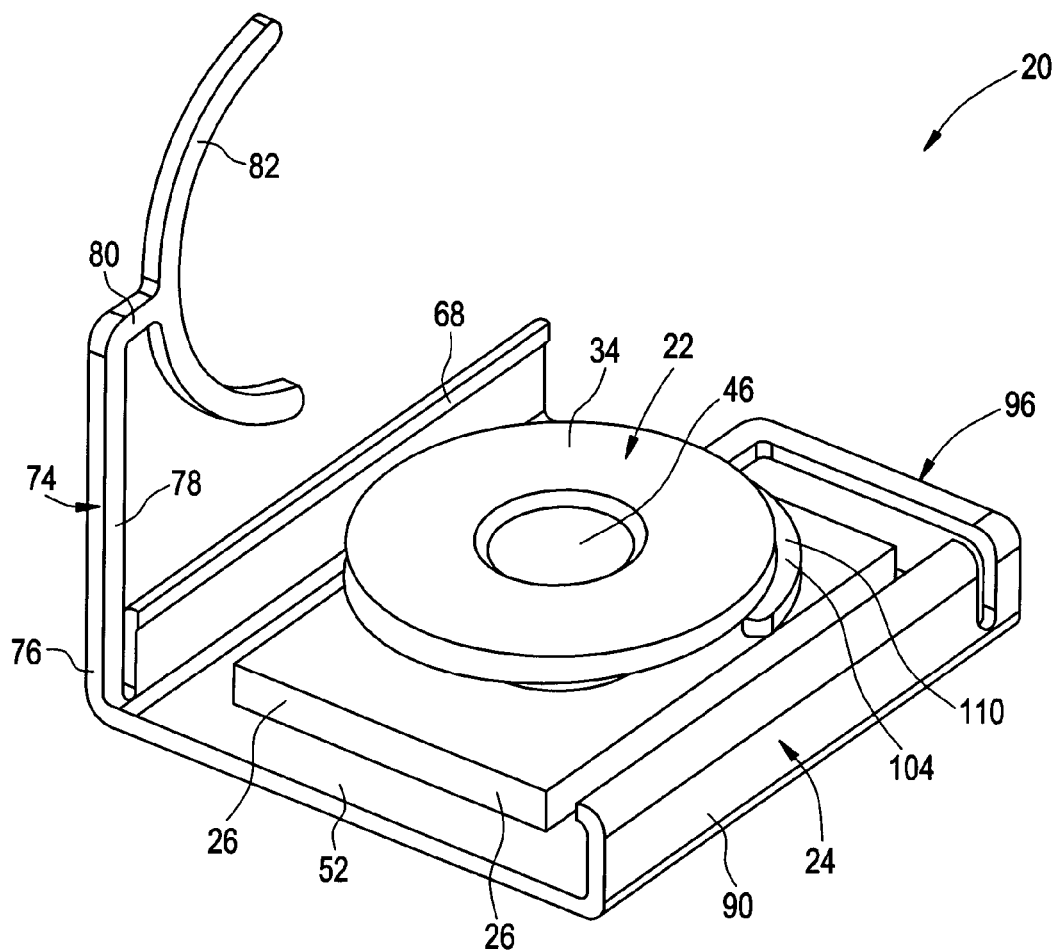
FIG. 6 is a perspective view of the cage nut assembly in accordance with an embodiment of the present invention prior to the cage supporting the nut off of a bottom wall of the cage.

In operation, the cage 24 is provided and the first arm portion 74 is flexed upwardly such that the first portion 76, the second portion 78, the third portion 80, and the C-shaped fourth portion 82 of the first arm portion 74 are all parallel to one another and are perpendicular to the base portion 52 of the cage 24, as illustrated in FIG. 6. The nut 22 is then positioned within the cage 24 by placing the second plate portion 34 on the C-shaped fourth portion 104 of the second arm portion 96, such that the lower surface 38 of the second plate portion 34 is positioned on the upper surface 110 of the C-shaped fourth portion 104 of the second arm portion 96.

Figure 7:
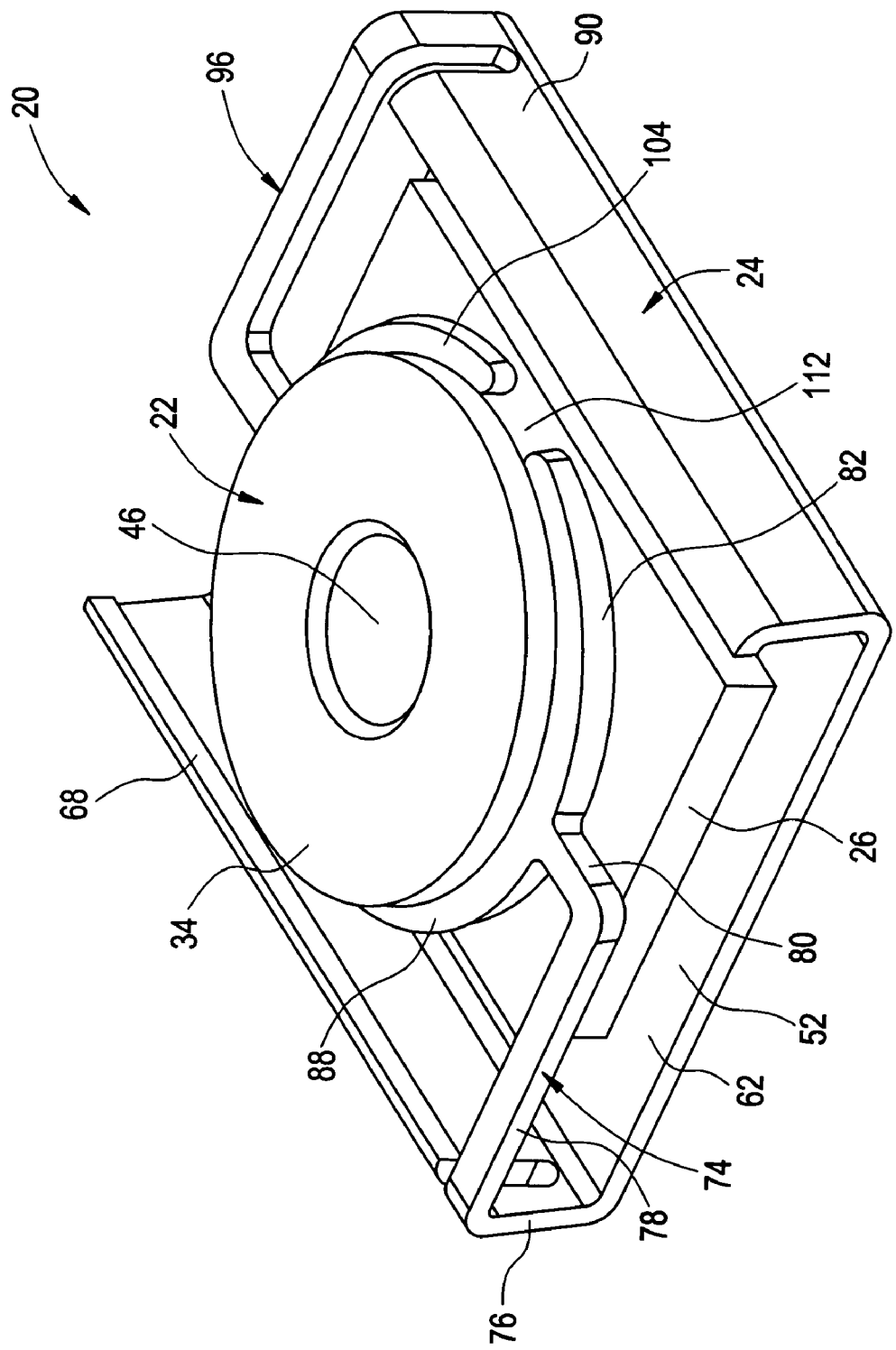
FIG. 7 is a perspective view of the cage nut assembly in accordance with an embodiment of the present invention with the cage supporting the nut off of the bottom wall of the cage.

The first arm portion 74 is then flexed downwardly such that the second portion 78, the third portion 80, and the C-shaped fourth portion 82 of the first arm portion 74 are all parallel to one another and to the base portion 52 of the cage 24, and are perpendicular to the first portion 76 of the first arm portion 74, as illustrated in FIG. 7. The C-shaped fourth portion 82 of the first arm portion 74 is positioned underneath the second plate portion 34 of the nut 22, such that the lower surface 38 of the second plate portion 34 is positioned on the upper surface 88 of the C-shaped fourth portion 82 of the first arm portion 74. The opening 112 formed by the C-shaped fourth portions 82, 104 of the first and second arm portions 74, 96 has a diameter which is smaller than a diameter of the second plate portion 34 such that the nut 22 cannot fall through the opening 112.

Figure 8:
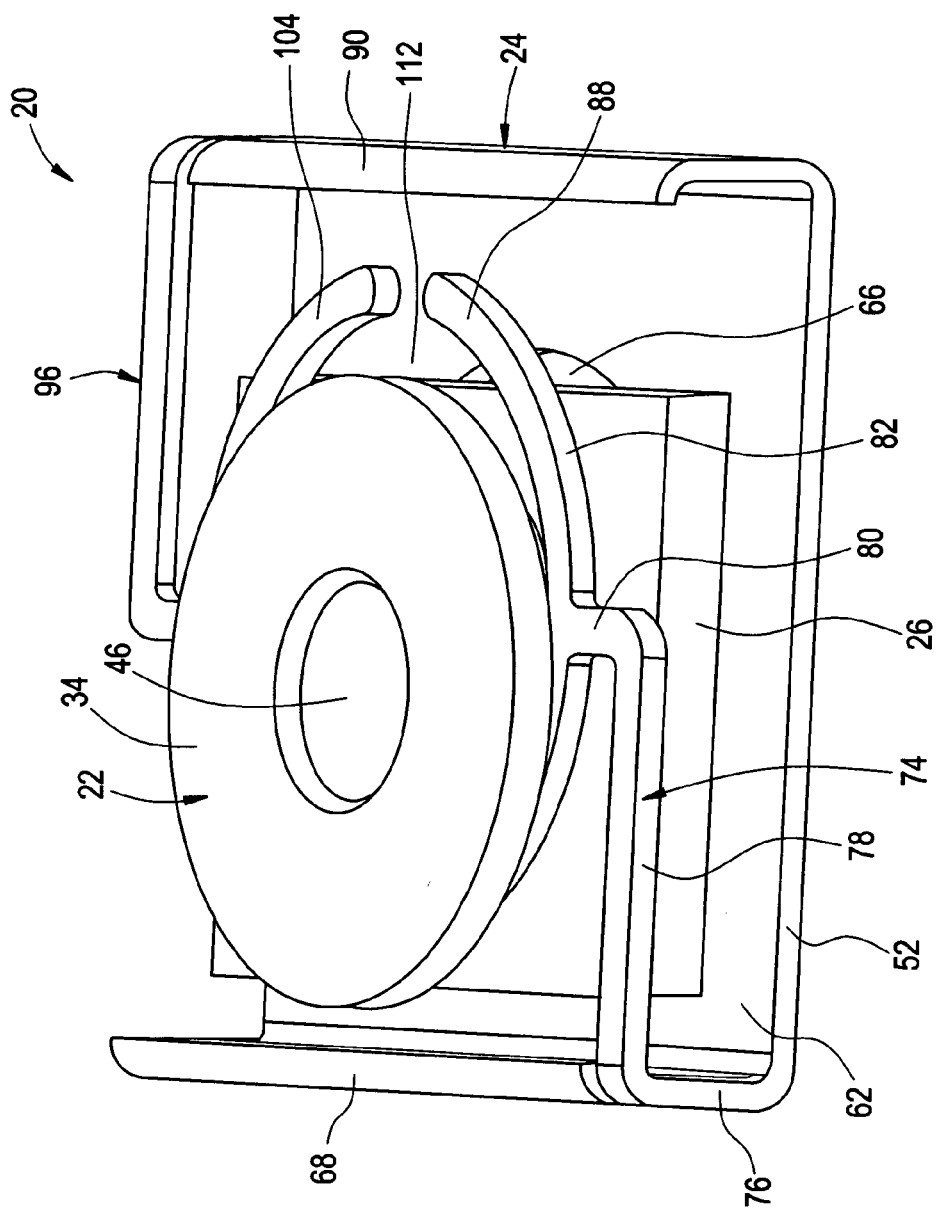
FIG. 8 is a perspective view of the cage nut assembly in accordance with an embodiment of the present invention with the cage supporting the nut off of the bottom wall of the cage and with the nut having floated toward a sidewall of the cage, relative to the nut illustrated in FIG. 7.

With the second plate portion 34 being positioned on the C-shaped fourth portions 82, 104 of the first and second arm portion 74, 96, the plate portion 26 is held up off of the upper surface 62 of the base portion 52 of the cage 24, as illustrated in FIG. 7. The first and second arm portions 74, 96 are formed of a material which is strong enough, without a force being applied thereto, to support the weight of the nut 22, such that the lower surface (not shown) of the plate portion 26 of the nut 22 does not come into contact with the upper surface 62 of the base portion 52 of the cage 24. As illustrated in FIG. 8, the nut 22 is allowed to float in the "X" and "Y" directions within the opening 112 formed by the C-shaped fourth portions 82, 104 of the first and second arm portions 74, 96 because the cylindrical member 42 of the nut 22 has a diameter which is smaller than the diameter of the opening 112. The aperture 66 of the base portion 52 of the cage 24 is large enough such that the aperture 46 of the nut 22 will always be in communication with the aperture 66 of the cage 24 within the float limitations of the nut 22 defined by the C-shaped fourth portions 82, 104 of the first and second arm portions 74, 96.

The lower surface 64 of the base portion 52 of the cage 24 is then welded to a workpiece 120. The workpiece 120 has an aperture 121 provided therethrough and first and second surfaces 122, 124. The lower surface 64 of the base portion 52 of the cage 24 is welded to the first surface 122 of the workpiece 120 such that the aperture of the workpiece 120 is in communication with the aperture 66 of the base portion 52 of the cage 24, and with the aperture 46 which extends through the nut 22. The workpiece 120, the cage 24 and the nut 22 are then typically sent through an e-coat or ELPO bath that is meant to add a corrosion or paint coating to the first surface 122 of the workpiece 120. The C-shaped fourth portions 82, 104 of the first and second arm portions 74, 96 support the nut 22 from coming into contact with the upper surface 62 of the base portion 52 of the cage 24, thus reducing the possibility that the cage 24 and the nut 22 will stick or adhere to each other after coating or welding is complete.

It should be noted that if the protrusions 44 are provided on the lower surface 38 of the second plate portion 34, the possibility that the cage 24 and the nut 22 will stick or adhere to each other after coating or welding is complete is reduced even further as the protrusions 44 will allow only minimal contact between the nut 22 and the cage 24 with only the protrusions 44 coming into contact with the upper surfaces 88, 110 of the C-shaped fourth portions 82, 104 of the first and second arm portions 74, 96.

Figure 9:
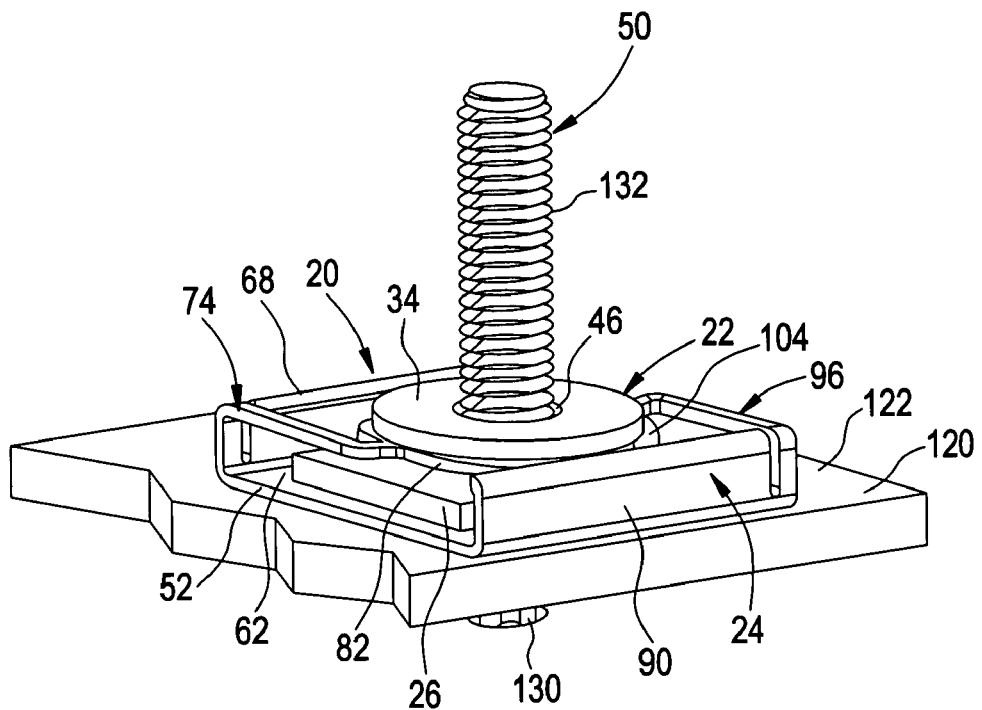
FIG. 9 is a perspective view of the cage nut assembly in accordance with an embodiment of the present invention being connected to a workpiece by a fastener.
Figure 10:
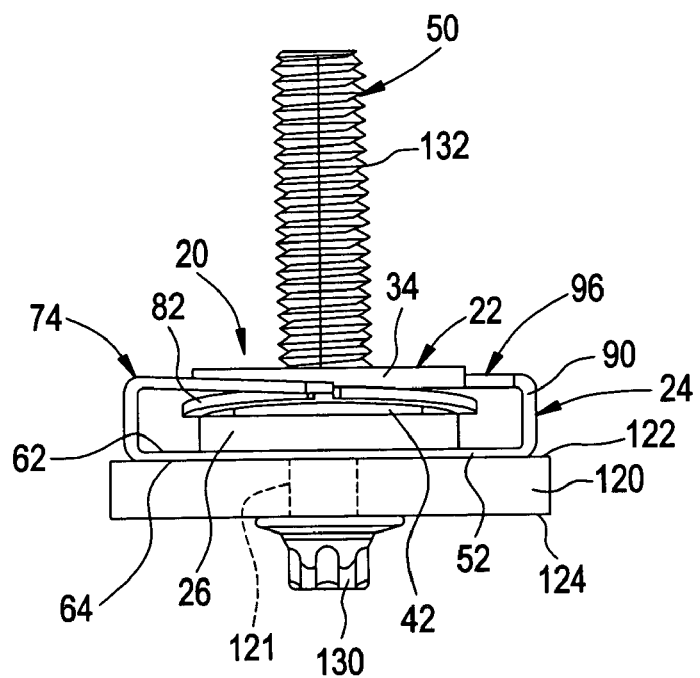
FIG. 10 is a side-elevation view of the cage nut assembly in accordance with an embodiment of the present invention being connected to the workpiece by the fastener.

The fastener 50, such as a bolt or a screw, which has a head portion 130 and a threaded shank portion 132 extending therefrom, is then connected to the cage nut assembly 20 and the workpiece 120. The fastener 50 is connected by inserting the threaded shank portion 132 of the fastener 50 through the aperture 121 of the workpiece 120, through the aperture 66 of the base portion 52 of the cage 24 and into the aperture 46 of the nut 22, such that the threaded shank portion 132 of the fastener 50 is threadedly engaged with the aperture wall 48 of the nut 22, until the head portion 130 of the fastener 50 abuts against the second surface 124 of the workpiece 120, as illustrated in FIGS. 9 and 10. The aperture wall 48 may be pre-threaded or the fastener 50 may have a self-tapping thread thereon which forms a thread in the aperture wall 48 of the nut 22.

As the fastener 50 is torqued into place, by threaded engagement with the aperture wall 48 of the nut 22, the plate portion 26 of the nut 22 is pulled down to interface with the upper surface 62 of the base portion 52 of the cage 24, thus providing a solid joint between the nut 22, the cage 24, the workpiece 120 and the fastener 50. The plate portion 26 is able to be pulled down to interface with the upper surface 62 of the base portion 52 of the cage 24 because the first and second arm portions 74, 96 are flexed downward by a combination of the weight of the nut 22 and the force being applied to the nut 22 by the torqueing of the fastener 50. The flexed first and second arm portions 74, 96 are best illustrated in FIG. 10.

Thus, the cage nut assembly 20 provides stronger joints between the nut 22 and the cage 24 than cage nut assemblies of the prior art after the nut 22 is torqued into place. The cage nut assembly 20 also requires less manufacturing and provide for fewer parts than cage nut assemblies of the prior art, thus making the cage nut assembly 20 of the present invention cheaper to make. The nut 22 and the cage 24 of the cage nut assembly 20 also effectively reduce the possibility of the nut 22 sticking to the cage 24 once an e-coat or ELPO bath is applied.

While preferred embodiments of the invention are shown and described, it is envisioned that those skilled in the art may devise various modifications without departing from the spirit and scope of the foregoing description and the appended claims.

The invention is claimed as follows:

1. A cage member engageable with a nut member having a first portion, a second portion and an aperture which extends at least partially therethrough, thereby providing a cage nut assembly, said cage member comprising:
    a body configured to encage the nut member and having an aperture formed therein, said aperture configured to allow access to the aperture of the nut member when the nut member is generally encaged by said cage member, said body defining a base portion and at least one wall portion, said body being configured to engage the first portion of the nut member such that the second portion of the nut member does not come into contact with either said base portion or said at least one wall portion such that said body provides a limited range of movement of the nut member in three dimensions, said body configured to allow access to the aperture of the nut member within the limited range of movement of the nut member provided by said body, said body further comprises at least one arm portion which extends from said base portion and serves to engage the first portion of the nut member, wherein said at least one arm portion comprises two arm portions which are positioned opposite of one another, said base portion is rectangular such that said base portion has four corners, one of said arm portions extending from one of said corners of said base portion and said other one of said arm portions extending from another one of said corners of said base portion.

2. A cage member as defined in claim 1, wherein said opposite facing arm portions define an opening therebetween, said opening sized to receive the nut member therethrough when the first portion of the nut member is engaged by said two arm portions.

3. A cage member as defined in claim 2, wherein each said arm portion has a generally C-shaped portion, said C-shaped portions being positioned opposite one another and defining said opening.

4. A cage member as defined in claim 1, wherein said at least one arm portion is formed of a flexible material.

5. A cage member as defined in claim 1, wherein said two arm portions extends from opposite sides of said base portion.

6. A cage member as defined in claim 1, wherein said two arm portions are configured to move independently of one another.

7. A cage member engageable with a nut member having a first portion, a second portion and an aperture which extends at least partially therethrough, thereby providing a cage nut assembly, said cage member comprising:
    a body configured to encage the nut member and having an aperture formed therein, said aperture configured to allow access to the aperture of the nut member when the nut member is generally encaged by said cage member, said body defining a base portion and at least one wall portion, said body being configured to engage the first portion of the nut member such that the second portion of the nut member does not come into contact with either said base portion or said at least one wall portion such that said body provides a limited range of movement of the nut member in three dimensions, said body configured to allow access to the aperture of the nut member within the limited range of movement of the nut member provided by said body, said body further comprises at least one arm portion which extends from said base portion and serves to engage the first portion of the nut member, said at least one wall portion comprises first and second wall portions, and wherein said at least one arm portion can be moved to allow the second portion of the nut member to be positioned above said base portion of said body and between said first and second wall portions of said body.

8. A cage member as defined in claim 7, wherein said at least one arm portion comprises two arm portions which are positioned opposite of one another.

9. An assembly configured to receive a fastener, said assembly comprising;
    a nut member having a first portion, a second portion and an aperture which extends at least partially therethrough; and
    a cage member configured to encage the nut member and having an aperture formed therein, said aperture configured to allow access to said aperture of said nut member when said nut member is generally encaged by said cage member, said cage member defining a base portion and at least one wall portion, said cage member being configured to engage the first portion at of the nut member such that the second portion of said nut member does not come into contact with either said base portion or said at least one wall portion such that said cage member provides a limited range of movement of said nut member in three dimensions, said body configured to allow access to said aperture of said nut member within the limited range of movement of said nut member provided by said cage member, said cage member comprises at least one arm portion which extends from said base portion and serves to engage said first portion of said nut member, said at least one arm portion comprises two arm portions which are positioned opposite of one another, said base portion is rectangular such that said base portion has four corners, one of said arm portions extending from one of said corners of said base portion and said other one of said arm portions extending from another one of said corners of said base portion.

10. An assembly as defined in claim 9, wherein said opposite facing arm portions define an opening therebetween, said opening sized to receive said nut member therethrough when said first portion of said nut member is engaged by said two arm portions.

11. An assembly as defined in claim 10, wherein each said arm portion has a generally C-shaped portion, said C-shaped portions being positioned opposite one another and defining said opening.

12. An assembly as defined in claim 10, wherein said two arm portions have top surfaces, said first portion of said nut member being positioned on said top surfaces of said two arm portions such that said second portion of said nut member does not come into contact with either said base portion or said at least one wall portion.

13. An assembly as defined in claim 12, wherein said first portion of said nut member has protrusions extending therefrom, said protrusions being positioned against said upper surfaces of said two arm portions.

14. An assembly as defined in claim 12, wherein said base portion of said cage member has a generally planar upper surface, said upper surfaces of said two arm portions being generally parallel to said upper surface of said base portion of said cage member.

15. An assembly as defined in claim 9, wherein said nut member has a first plate, a second plate and a member which connects said first plate to said second plate, each said plate having an upper surface and a lower surface, said member extending between said upper surface of said first plate and said lower surface of said second plate, said aperture of said nut member extending through said first plate, said member and said second plate.

16. An assembly as defined in claim 9, wherein said two arm portions extend from opposite sides of said base portion.

17. An assembly as defined in claim 9, wherein said two arm portions are configured to move independently of one another.

18. An assembly configured to receive a fastener, said assembly comprising:
a nut member having a first portion, a second portion and an aperture which extends at least partially therethrough; and
a cage member configured to encage the nut member and having an aperture formed therein, said aperture configured to allow access to said aperture of said nut member when said nut member is generally encaged by said cage member, said cage member defining a base portion and at least one wall portion, said cage member being configured to engage the first portion of the nut member such that the second portion of said nut member does not come into contact with either said base portion or said at least one wall portion such that said cage member provides a limited range of movement of said nut member in three dimensions, said body configured to allow access to said aperture of said nut member within the limited range of movement of said nut member provided by said cage member, said cage member comprises at least one arm portion which extends from said base portion and serves to engage said first portion of said nut member, said at least one wall portion comprises first and second wall portions, and wherein said at least one arm portion can be moved to allow said second portion of said nut member to be positioned above said base portion of said cage member and between said first and second wall portions of said cage member.

19. An assembly as defined in claim 18, wherein said at least one arm portion comprises two arm portions which are positioned opposite of one another.

20. An assembly as defined in claim 18, wherein said at least one arm portion is formed of a flexible material.

21. An assembly configured to receive a fastener, said assembly comprising:
a nut member having a first portion, a second portion and an aperture which extends at least partially therethrough; and
a cage member configured to encage the nut member and having an aperture formed therein, said aperture configured to allow access to said aperture of said nut member when said nut member is generally encaged by said cage member, said cage member defining a base portion and at least one wall portion, said cage member being configured to engage the first portion of the nut member such that the second portion of said nut member does not come into contact with either said base portion or said at least one wall portion such that said cage member provides a limited range of movement of said nut member in at least one dimension, said body configured to allow access to said aperture of said nut member within the limited range of movement of said nut member provided by said cage member, said cage member comprises at least one arm portion which extends from said base portion and serves to engage said first portion of said nut member, said at least one arm portion comprises two arm portions which are positioned opposite of one another, said base portion is rectangular such that said base portion has four corners, one of said arm portions extending from one of said corners of said base portion and said other one of said arm portions extending from another one of said corners of said base portion, said opposite facing arm portions define an opening therebetween, said opening sized to receive said nut member therethrough when said first portion of said nut member is engaged by said two arm portions, said two arm portions have top surfaces, said first portion of said nut member being positioned on said top surfaces of said two arm portions such that said second portion of said nut member does not come into contact with either said base portion or said at least one wall portion.

22. An assembly as defined in claim 21, wherein said first portion of said nut member has protrusions extending therefrom, said protrusions being positioned against said upper surfaces of said two arm portions.

23. An assembly as defined in claim 21, wherein said base portion of said cage member has a generally planar upper surface, said upper surfaces of said two arm portions being generally parallel to said upper surface of said base portion of said cage member.

24. An assembly configured to receive a fastener, said assembly comprising:
a nut member having a first portion, a second portion and an aperture which extends at least partially therethrough, said nut member has a first plate, a second plate and a member which connects said first plate to said second plate, each said plate having an upper surface and a lower surface, said member extending between said upper surface of said first plate and said lower surface of said second plate, said aperture of said nut member extending through said first plate, said member and said second plate; and
a cage member configured to encage the nut member and having an aperture formed therein, said aperture configured to allow access to said aperture of said nut member when said nut member is generally encaged by said cage member, said cage member defining a base portion and at least one wall portion, said cage member being configured to engage the first portion of the nut member such that the second portion of said nut member does not come into contact with either said base portion or said at least one wall portion such that said cage member provides a limited range of movement of said nut member in at least one dimension, said body configured to allow access to said aperture of said nut member within the limited range of movement of said nut member provided by said cage member, said cage member comprises at least one arm portion which extends from said base portion and serves to engage said first portion of said nut member, said at least one arm portion comprises two arm portions which are positioned opposite of one another, said base portion is rectangular such that said base portion has four corners, one of said arm portions extending from one of said corners of said base portion and said other one of said arm portions extending from another one of said corners of said base portion.

25. A cage member engageable with a nut member having a first portion, a second portion and an aperture which extends at least partially therethrough, thereby providing a cage nut assembly, said cage member comprising:
a body configured to encage the nut member and having an aperture formed therein, said aperture configured to allow access to the aperture of the nut member when the nut member is generally encaged by said cage member, said body defining a base portion and at least one wall portion, said body being configured to engage the first portion of the nut member such that the second portion of the nut member does not come into contact with either said base portion or said at least one wall portion such that said body provides a limited range of movement of the nut member in three dimensions, said body configured to allow access to the aperture of the nut member within the limited range of movement of the nut member provided by said body, said body further comprises at least one arm portion which extends from said base portion and serves to engage the first portion of the nut member, said body further comprises at least one arm portion which extends directly from said base portion.

26. An assembly configured to receive a fastener, said assembly comprising:
a nut member having a first portion, a second portion and an aperture which extends at least partially therethrough; and
a cage member configured to encage the nut member and having an aperture formed therein, said aperture configured to allow access to said aperture of said nut member when said nut member is generally encaged by said cage member, said cage member defining a base portion and at least one wall portion, said cage member being configured to engage the first portion of the nut member such that the second portion of said nut member does not come into contact with either said base portion or said at least one wall portion such that said cage member provides a limited range of movement of said nut member in three dimensions, said body configured to allow access to said aperture of said nut member within the limited range of movement of said nut member provided by said cage member, said cage member comprises at least one arm portion which extends from said base portion and serves to engage said first portion of said nut member, said cage member comprises at least one arm portion which extends directly from said base portion.

27. A cage member engageable with a nut member having an aperture which extends at least partially therethrough to receive a fastener therein, thereby providing a cage nut assembly, said cage member comprising:
a body configured to encage the nut member and having an aperture formed therein, said aperture configured to allow access to the aperture of the nut member when the nut member is generally encaged by said cage member, said body defining a base portion, said body engaging the nut member such that the nut member is suspended off of said base portion, said body provides a limited range of movement of the nut member in three dimensions, said body configured to allow access to the aperture of the nut member within the limited range of movement of the nut member provided by said body, said body further comprises at least one arm portion which extends from said base portion and serves to suspend the nut member off of said base portion prior to the fastener being received in the aperture of the nut member, said at least one arm portion extends directly from said base portion.

28. An assembly configured to receive a fastener, said assembly comprising:
a nut member having an aperture which extends at least partially therethrough to receive the fastener therein; and
a cage member configured to encage said nut member and having an aperture formed therein, said aperture configured to allow access to said aperture of said nut member when said nut member is generally encaged by said cage member, said cage member defining a base and a body portion, said body engaging said nut member such that said nut member is suspended off of said base portion, said cage member provides a limited range of movement of said nut member in three dimensions, said cage member configured to allow access to said aperture of said nut member within the limited range of movement of said nut member provided by said cage member, said cage member further comprises at least one arm portion which extends from said base portion and serves to suspend said nut member off of said base portion prior to the fastener being received in said aperture of said nut member, said at least one arm portion extends directly from said base portion.

* * * * *